(12) United States Patent
Hirayama et al.

(10) Patent No.: US 6,655,433 B1
(45) Date of Patent: Dec. 2, 2003

(54) OPTICAL FIBER RIBBONIZING APPARATUS

(75) Inventors: Mamoru Hirayama, Ibaraki (JP); Koichi Arishima, Mito (JP); Shin Sumida, Tsukuba (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 170 days.

(21) Appl. No.: 09/722,662

(22) Filed: Nov. 28, 2000

(30) Foreign Application Priority Data

Nov. 30, 1999 (JP) .......................................... 11-340260

(51) Int. Cl.$^7$ ................................................ B65H 1/00
(52) U.S. Cl. .................... 156/436; 156/180; 156/275.5; 156/371.8; 385/114; 264/1.28
(58) Field of Search ................................. 156/166, 180, 156/181, 379.6, 379.8, 380.9, 436, 272.2, 272.8, 275.5, 275.7; 385/97, 114; 264/1.27, 1.28; 427/163.2

(56) References Cited

U.S. PATENT DOCUMENTS

| | | | | |
|---|---|---|---|---|
| 4,129,468 A | * | 12/1978 | Knab | 156/148 |
| 4,289,558 A | * | 9/1981 | Eichenbaum et al. | 156/179 |
| 4,720,165 A | * | 1/1988 | Tokuda et al. | 156/166 |
| 5,089,185 A | * | 2/1992 | Hirano et al. | 264/401 |
| 5,115,761 A | * | 5/1992 | Hood | 118/641 |
| 6,224,709 B1 | * | 5/2001 | Takemoto et al. | 156/275.5 |

FOREIGN PATENT DOCUMENTS

| | | |
|---|---|---|
| JP | 60263109 | 12/1985 |
| JP | 5232362 | 5/1993 |
| JP | 06258533 | 9/1994 |

OTHER PUBLICATIONS

EPO Patent Application 0194891 A1 Sep. 1986, GB Ashpole, Raymond.*

* cited by examiner

Primary Examiner—Michael W. Ball
Assistant Examiner—John L. Goff
(74) Attorney, Agent, or Firm—Venable LLP; Michael A. Sartori

(57) ABSTRACT

An optical fiber ribbonizing apparatus is disclosed which arranges a plurality of optical fibers in parallel, applies a resin to peripheries of the plurality of optical fibers, and hardens the resin to form the optical fibers into a ribbon. The apparatus comprises a ribbonizing jig integrally including an optical fiber aligning mechanism for aligning the plurality of optical fibers in parallel, a resin applying mechanism for applying the resin to the optical fibers aligned by the fiber aligning mechanism and a resin hardening device for hardening the resin applied to the optical fibers by the resin applying mechanism, the optical fiber aligning mechanism, the resin applying mechanism and the resin hardening device being arranged in a line in an optical fiber inserting direction, and movement mechanism for moving at least one of the ribbonizing jig and the optical fibers in a predetermined direction relative to the other.

20 Claims, 10 Drawing Sheets

OPTICAL FIBER RIBBONIZING APPARATUS

This application is based on Patent Application No. 11-340260 (1999) filed Nov. 30, 1999 in Japan, the content of which is incorporated hereinto by reference.

BACKGROUND OF THE INVENTION

1. Field of the Invention

The present invention relates to an apparatus for ribbonizing a plurality of optical fibers in a flat form, the optical fibers being located on an optical circuit board to connect together optical elements, optical parts, optical boards, or the like for use in optical communication or optical data processing or being projected from an optical element.

2. Description of the Related Art

A technique for ribbonizing a plurality of optical fibers is disclosed, for example, in Japanese Patent No. 1860808, Japanese Patent Application Laid-open No. 5-232362 (1993), or the like. This is a mass production technique for industrially ribbonizing long optical fibers. A conventional optical fiber ribbonizing apparatus comprises a jig (hereafter referred to as "a ribbonizing jig") installed between a supplying bobbin and a winding bobbin and having a section in which a plurality of optical fibers are aligned with one another, a section for applying an ultraviolet hardening resin to the optical fibers, and a section for hardening the resin, and uses a winding force of the winding bobbin to apply an appropriate tension to the optical fibers while moving them, thereby continuously ribbonizing the fibers. In addition, the ribbonizing jig section is closed once the long optical fibers have been set in order to achieve efficient application of an ultraviolet hardening resin or ultraviolet rays for ribbonizing the optical fibers, so that it cannot be opened or closed easily.

In general, short optical fibers, that is, pig tails are often drawn out from an I/O section of an optical part. There has thus been a need to ribbonize the pig tail section because it may have to be connected to a multi-core connector or because multiple pig tails may have to be collectively melted for connection. It is therefore necessary to develop a method and apparatus for exclusively ribbonizing short fibers.

In the above described conventional ribbonizing apparatus, however, a side to which optical fibers to be ribbonized are supplied and a side in which the ribbonized optical fibers are wound each use a bobbin, so that the length of the optical fibers required for ribbonization is at least equal to the interval between the bobbins. As a result, the conventional apparatus cannot ribbonize such short optical fibers.

Additionally, a method for moving or tensing optical fibers using bobbins is not applicable because short optical fibers are inappropriate for this method. Accordingly, ribbonizing jigs are required which can tense short optical fibers while moving them along a longitudinal direction thereof.

Further, if optical fibers are short and entangled with one another, it is important to reliably separate the fibers and align them at a predetermined position before ribbonization in order to prevent errors in arrangement of the ribbonized optical fibers.

Moreover, if short optical fibers must be collectively ribbonized into a large number of tape bundles, it is necessary to simply set the fibers in the ribbonizing jigs, allow an ultraviolet hardening resin to be reliably applied, prevent ultraviolet rays from leaking, and enable efficient oxygen purging with an inert gas in order to improve ultraviolet hardening.

An apparatus for ribbonizing short optical fibers is manufactured and sold by Furukawa Denko under the name of Optical Ribbonizer. This, however, is manual and is not suited for industrial mass production.

In addition, an optical circuit board requires a large number of fiber bundles projecting therefrom to be ribbonized at relatively small intervals. In this case, however, if the groups of fiber bundles are individually ribbonized, since the interval between a ribbonized fiber bundle and an adjacent pre-ribbonized fiber bundle is small, it is very difficult to set the fiber bundles in the ribbonizing jigs. Consequently, an exclusive apparatus is required to collectively ribbonize a plurality of fiber bundles at small intervals.

Furthermore, in the case of optical fibers such as pig tails from an optical circuit board or an optical element which have one end fixed, part of the fiber receives no ultraviolet hardening resin and fails to be ribbonized due to the interval between an ultraviolet hardening resin applying section and an ultraviolet hardening resin hardening section of the ribbonizing apparatus. This part of the optical fiber corresponds to a root thereof which is fixed and In which stress is likely to concentrate if it is effected on the fiber. Thus, the ribbonization must take reinforcement of the root into account.

SUMMARY OF THE INVENTION

It is an object of the present invention to provide an optical fiber ribbonizing apparatus that solves the various above-described problems.

In a first aspect of the present invention, there is provided an optical fiber ribbonizing apparatus that arranges a plurality of optical fibers in parallel, applies a resin to peripheries of the plurality of optical fibers, and hardens the resin to form the optical fibers into a ribbon, the apparatus comprising: a ribbonizing jig including fiber aligning means for aligning the plurality of optical fibers in parallel, resin applying means for applying the resin to the plurality of optical fibers aligned by the fiber aligning means, and resin hardening means for hardening the resin applied to the optical fibers by the resin applying means, the fiber aligning means, the resin applying means and the resin hardening means being arranged in a line in an optical fiber inserting direction; and movement means for moving at least one of the ribbonizing jig and the plurality of optical fibers in a predetermined direction relative to the other.

Here, the movement means may comprise a linear motion stage including a movement table that linearly moves in a longitudinal direction of the optical fibers and a fixed table.

The movement means may comprise a pair of rotary rollers for rotationally moving the optical fibers while vertically sandwiching them therebetween.

The movement means may comprise a belt conveyor for moving the optical fibers while holding them.

The fiber alignment means may comprise a comb-shaped member having slits for individually guiding the plurality of optical fibers.

The fiber aligning means may comprise an alignment slit member having a gap corresponding to one optical fiber and through which a plurality of optical fibers can be inserted in parallel, and a spacer sliding through the slit.

The fiber alignment means may comprise a drum having guide grooves formed along a circumferential direction of a peripheral surface thereof in such a manner that a pitch of the optical fibers increases gradually from a pitch wherein the optical fibers are closely aligned with one another.

The fiber alignment means may comprise a plate having guide grooves formed in a plane thereof in such a manner that a pitch of the optical fibers increases gradually along the plane from a pitch wherein the optical fibers are closely aligned with one another.

The resin applying means may comprise a main body having a resin vessel formed therein and first and second guide grooves formed therein for guiding the plurality of optical fibers before and after the resin vessel while aligning them, and first and second presser plates for pressing the optical fibers aligned in the first and second guide grooves, and a humped presser plate for pressing the aligned optical fibers into the resin vessel.

The first and second presser plates are movable from a first open position to a second position for pressing the optical fibers into the main body, the first and second presser plates being maintained in the second position by a magnetic force.

The first and second presser plates may press the optical fibers by sliding over the first and second guide grooves in a direction that crosses the optical fibers.

The humped presser plate is movable from a first open position to a second position for pressing the optical fibers into the main body, the humped presser plate having a projection on a surface thereof that presses the optical fibers into the resin vessel. The projection extends beyond the bottom surfaces of the first and second guide grooves when the optical fibers are pressed.

The resin hardening means may comprise ultraviolet ray-applying and fiber-holding members located above and below the optical fibers, light guides for applying ultraviolet rays for hardening, the light guides being held in the ultraviolet ray-applying and fiber-holding members, and gas introducing pipes for introducing an inert gas into a chamber between each of the ultraviolet ray-applying and fiber-holding members and the corresponding light guide.

The ultraviolet ray-applying and fiber-holding members may be cylindrical members, and the lower cylindrical member may be mounted in a hole formed in the movement table while the upper cylindrical member may be mounted on the movement table via an adapter.

At least portions of the fiber aligning means, the resin applying means, and resin hardening means which are in contact with the optical fibers may comprise a material having a smaller friction coefficient than a coating material for the optical fibers.

In a second aspect of the present invention, there is provided an optical fiber ribbonizing apparatus that arranges a plurality of optical fibers in parallel, applies a resin to peripheries of the plurality of optical fibers, and hardens the resin to form the optical fibers into a tape or a ribbon, the apparatus comprising: fiber aligning means for aligning the plurality of optical fibers in parallel, resin applying means for applying the resin to the plurality of optical fibers aligned by the fiber aligning means, and resin hardening means for hardening the resin applied to the optical fibers by the resin applying means, the fiber aligning means, the resin applying means and the resin hardening means being arranged in a line in an optical fiber inserting direction; and movement means for moving the plurality of optical fibers in a predetermined direction relative to the fiber aligning means, the resin applying means and the resin hardening means, wherein: the fiber aligning means, the resin applying means, the resin hardening means, and the movement means are formed within an integral main body.

Here, the movement means may be a pair of rotary rollers for rotationally moving the optical fibers while sandwiching them therebetween The main body may comprise a handle section having a built-in resin tank and the rotary rollers are driven by a motor activated by means of a trigger.

The resin hardening means may comprise ultraviolet ray-applying and fiber-holding means located above and below the optical fibers, light guides for applying ultraviolet rays for hardening, the light guides being held in the ultraviolet ray-applying and fiber-holding means, and a gas introducing pipe for introducing an inert gas into a chamber between each of the ultraviolet ray-applying and fiber-holding means and the corresponding light guide, and the upper ultraviolet ray-applying and fiber-holding means is a member hinged to the main body, while the lower ultraviolet ray-applying and fiber-holding means is the main body.

In a third aspect of the present invention, there is provided an optical fiber ribbonizing apparatus that arranges a plurality of optical fibers in parallel, applies a resin to peripheries of the plurality of optical fibers, and hardens the resin to form the optical fibers into a plurality of tapes or ribbons, the apparatus comprising: fiber aligning means for aligning the plurality of optical fibers in parallel, resin applying means for applying the resin to the plurality of optical fibers aligned by the fiber aligning means, and resin hardening means for hardening the resin applied to the optical fibers by the resin applying means, the fiber aligning means, the resin applying means and the resin hardening means being arranged in a line in an optical fiber inserting direction; and movement means for moving the plurality of optical fibers in a predetermined direction relative to the fiber aligning means, the resin applying means and the resin hardening means, wherein: the fiber aligning means, the resin applying means and the resin hardening means are each formed to allow plural bundles of optical fibers to be individually inserted therethrough to individually and collectively ribbonize the plural bundles of optical fibers.

Here, the movement means may be a belt conveyor for moving the optical fibers while holding them.

The fiber aligning means may comprise a comb-shaped member having slits for individually guiding the plurality of optical fibers.

The fiber alignment means may comprise a plate having guide grooves formed in a plane thereof in such a manner that a pitch of the optical fibers increases gradually along the plane from one with which they are closely aligned with one another.

The resin applying means may comprise a main body having a resin vessel formed therein and a first and a second guide grooves formed therein for guiding the plurality of optical fibers before and after the resin vessel while aligning them, and a first and a second presser plates for pressing the optical fibers aligned in the first and second guide grooves, and a humped presser plate for pressing the aligned optical fibers in the resin vessel.

The first and second presser plates can be stood up and brought down from and to the main body and a state where the first and second presser plates are brought down to press the optical fibers may be maintained by magnetic force.

The first and second presser plates may press the optical fibers by sliding over the first and second guide grooves in a direction that crosses the optical fibers.

The humped presser plate can be stood up and brought down from and to the main body and has a projection on a surface thereof that presses the optical fibers in the resin vessel, the projection being located deeper than bottom surfaces of the first and second guide grooves when the optical fibers may be pressed.

The resin hardening means may comprise ultraviolet ray-applying and fiber-holding means located above and below the optical fibers, light guides for applying ultraviolet rays for hardening, the light guides being held in the ultraviolet ray-applying and fiber-holding means, and a gas introducing pipe for introducing an inert gas into a chamber between each of the ultraviolet ray-applying and fiber-holding means and the corresponding light guide the upper ultraviolet ray-applying and fiber-holding means is a member hinged to the main body, while the lower ultraviolet ray-applying and fiber-holding means is the main body.

At least portions of the fiber aligning means, the resin applying means and resin hardening means which are in contact with the optical fibers may comprise a material having a smaller friction coefficient than a coating material for the optical fibers.

The above and other objects, features and advantages of the present invention will become more apparent from the following description of embodiments thereof taken in conjunction with the accompanying drawings.

DETAILED DESCRIPTION OF THE PREFERRED EMBODIMENTS

First Embodiment

Figure 1:
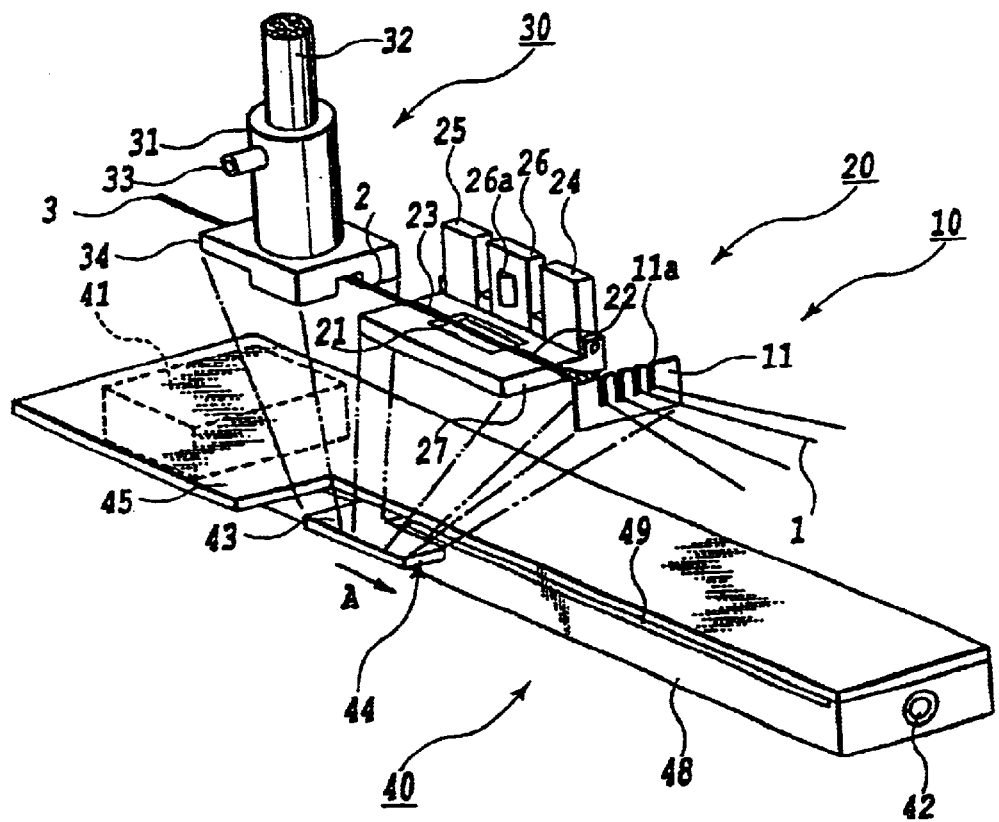
FIG. 1 is a perspective view of a ribbonizing apparatus according to a first embodiment of the present invention.

FIG. 1 is a perspective view of a ribbonizing apparatus according to a first embodiment of the present invention. Reference numeral 40 denotes a relative movement device (movement means) for relatively moving optical fibers and a ribbonizing jig described below. The relative movement device 40 has a linear motion stage 44 that linearly slides a movement table 43 while horizontally maintaining it with a screw shaft 42 rotating by means of a motor 41. The linear motion stage 44 includes the movement table 43 and a fixed table 45. According to this embodiment, the fixed table 45 is fixedly supported on a base frame 48 and the above described screw shaft 42 is rotatably supported in the base frame 48. In addition, the movement table 43 is connected to a nut (not shown) that is screwed over the screw shaft 42 and projects from a slit 49 under the fixed table 45, the slit being formed in an upper edge of the base frame 48. The movement table 43 is located in a notch portion of the fixed table 45.

The movement table 43 has ribbonizing jigs arranged and fixed in a line along an optical fiber inserting direction, the ribbonizing jigs including a fiber aligning section (fiber aligning means) 10 for aligning individual optical fibers 1, a resin applying section (resin applying means) for applying an ultraviolet hardening resin to aligned optical fibers 2, and a resin hardening section (resin hardening means) for hardening the ultraviolet hardening resin applied to the aligned optical fibers 2.

For easy understanding, individual optical fibers are labeled as 1, a plurality of aligned optical fibers are labeled as 2, and a plurality of aligned optical fibers that have been coated with a resin and then hardened are labeled as 3.

The above described fiber aligning section 10 is provided on a side through which the individual optical fibers 1 are introduced, and comprises a comb-shaped member 11 having slits 11a formed at generally equal intervals. The comb-shaped member 11 is provided at a front end of the movement table 43.

The resin applying section 20 comprises a main body 27 having a resin vessel 21 formed therein and in which an ultraviolet hardening resin is stored and guide grooves 22 and 23 also formed therein and through which the aligned optical fibers are guided before and after the resin vessel 21, respectively, a presser plate 24 that presses the optical fibers 2 in the front guide groove 22 from above, a presser plate 25 that presses the optical fibers 2 in the rear guide groove 23 from above, and a humped presser plate 26 having a projection 26a that presses the aligned optical fibers 2 into the resin vessel 21. In this manner, the resin applying section 20 is not a closed but an open structure.

The presser plates 24, 25, and 26 are hinged to the main body 27 so as to be clamped to the main body 27 side of the resin applying section 20 due to a magnetic force of a magnet when brought down. Additionally, the guide groove 22 is formed to have appropriate width and depth for most tightly aligning the plurality of optical fibers 1, and the guide groove 23 is formed to have a width and a depth slightly larger than those of the guide groove 22 in view of the thickness of the resin for ribbonization.

The comb-shaped member 11, the main body 27 having the resin vessel 21, and the guide grooves 22 and 23 formed therein as well as the presser plates 24, 25, and 26 are composed of a low-friction material such as Teflon (Du Pont's trade name) that has a smaller friction coefficient than an optical fiber coating-material, to avoid damaging the optical fibers 1 and 2 and facilitate cleaning of the resin after operation. In this regard, such a low-friction material may be present at least on the surfaces of these components.

Figure 2A:
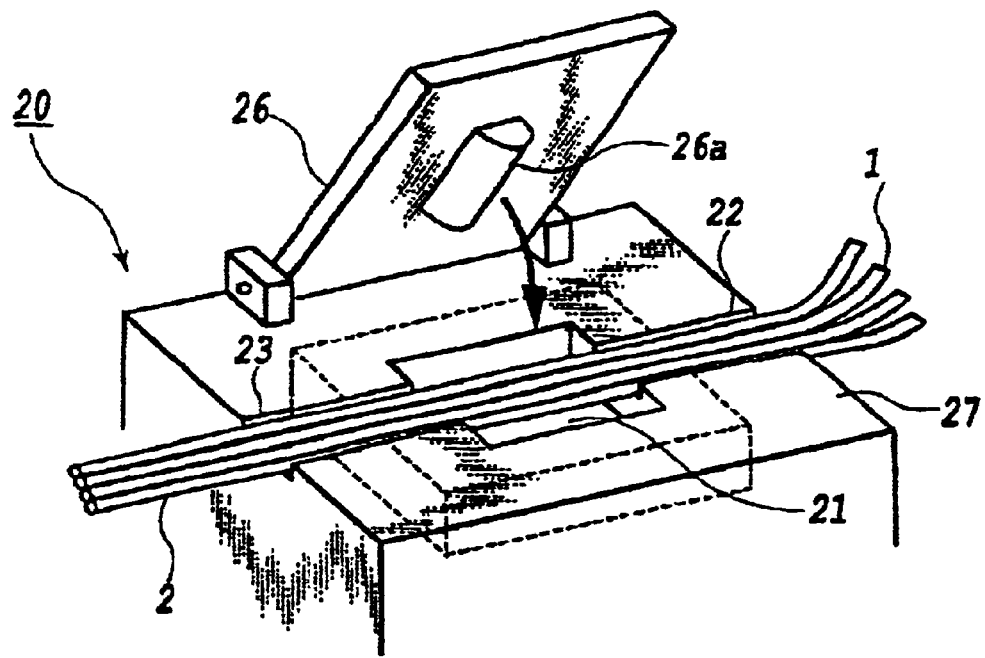
FIG. 2A is a view useful in explaining a resin applying section of the ribbonizing apparatus in FIG. 1
Figure 2B:
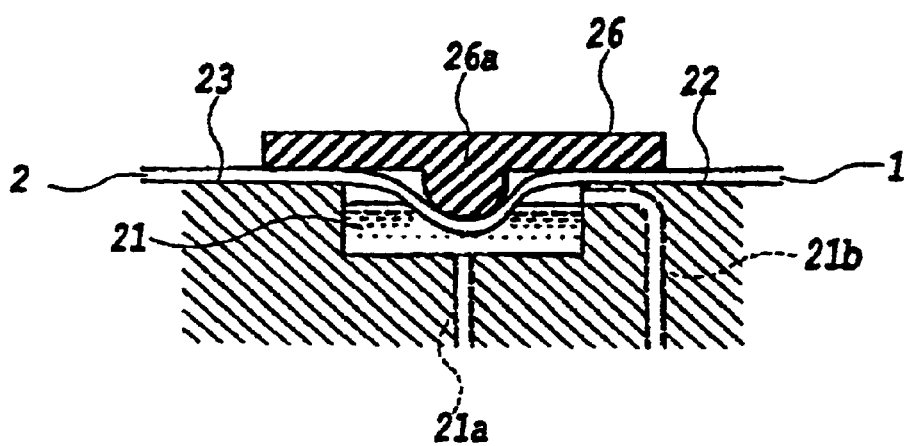
FIG. 2B is a view useful in explaining a resin vessel.

FIGS. 2A and 2B are detailed views of the resin vessel 21. The resin vessel 21 has a resin introducing hole 21a formed at a bottom thereof and an excess resin outflow hole 21b formed in an inner surface thereof as shown in FIG. 2B so that the vessel 21 is always filled with a constant amount of ultraviolet hardening resin, with an excess collected.

Figure 3A:
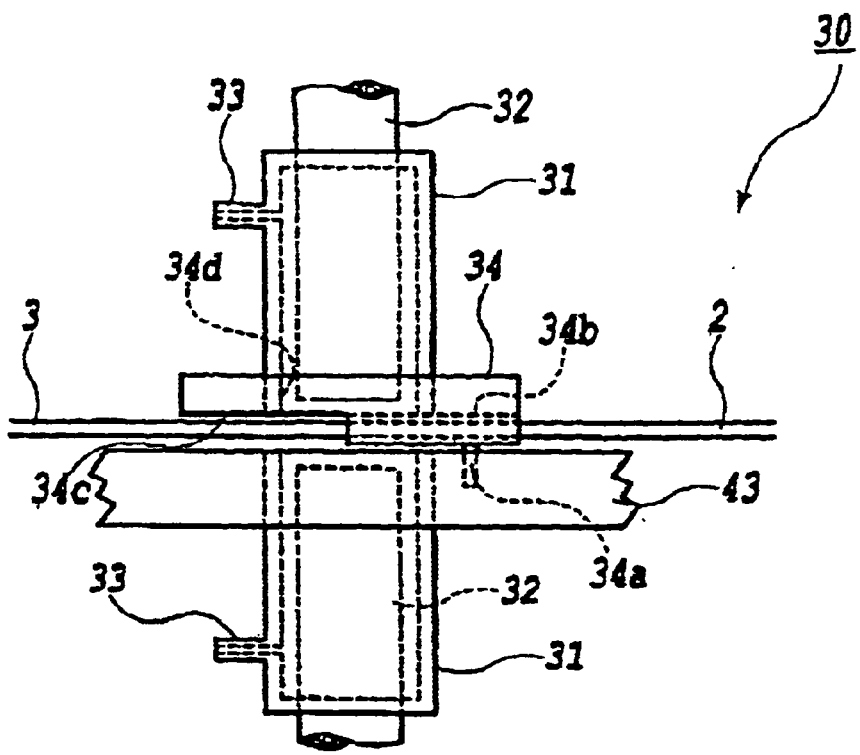
FIG. 3A is a view useful in explaining a resin hardening section of the ribbonizing apparatus in FIG. 1
Figure 3B:
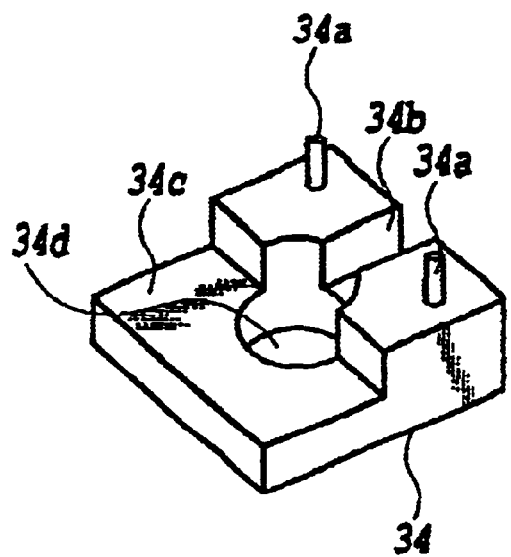
FIG. 3B is a perspective view of an adapter.

Resin hardening sections 30 are provided on the movement table 43 in such a fashion as to vertically sandwich the aligned optical fibers 2 coated with the resin, in a non-contact manner. FIG. 1 shows only an upper one of the resin hardening sections 30. FIG. 3A is a side view showing the resin hardening section 30. Reference numeral 31 denotes a cylindrical ultraviolet ray-applying and fiber-holding member having an open end through which a quartz fiber light guide 32 is inserted and coaxialy fixedly held. In a cavity between the ultraviolet ray-applying and fiber-holding member 31 and the quartz fiber light guide 32 is a chamber formed therein and which has an open end. The ultraviolet ray-applying and fiber-holding member 31 has a gas introducing pipe 33 leading to the chamber. The upper and lower ultraviolet ray-applying and fiber-holding members 31 are composed of the same parts, and the lower one 31 is fixed to the movement table 43 by means of screws or the like using a through-hole formed in the movement table 43, while the upper one 31 is mounted on the movement table 43 via an adapter 34 with pins 34a so as to be easily removed therefrom.

The adapter 34 has a groove 34b formed in a shielding wall such that aligned optical fibers 2 can pass through the groove 34b while ultraviolet rays are not applied toward the resin applying section 20. In addition, the adapter 34 has a spot facing 34c arranged with respect to the shielding wall and opposite to the groove 34b so that optical fibers extending from an optical circuit board (not shown) can be ribbonized from their roots closer to the optical circuit board. Reference numeral 34d denotes a hole through which the upper ultraviolet ray-applying and fiber-holding member 31 is inserted. The upper ultraviolet ray-applying and fiber-holding members 31 may be integrated with the adapter 34.

To introduce the individual optical fibers 1 to form the aligned optical fibers 2 and then obtain the ribbonized optical fibers 3, the following procedure is used.

First, the upper ultraviolet ray-applying and fiber-holding member 31 is removed together with the adapter 34 and the presser plates 24, 25 and 26 are opened up. The optical fibers to be ribbonized have one end (the left of FIG. 1) aligned and held on a top surface of the fixed table 45 and the other end drawn and arranged one by one in the corresponding slits 11a of the comb-shaped member 11. Then, the aligned optical fibers 2 located in the resin applying section 20 are more closely arranged while being pressed from above and inserted into the guide grooves 22 and 23 located before and after the resin vessel 21. The presser plates 24 and 25 are brought down over the aligned optical fibers 2 to press them.

Further, the resin vessel 21 is filled with the ultraviolet hardening resin for ribbonization beforehand and the presser plate 26 is brought down to cause the projection 26a to press and bend the aligned optical fibers 2, which are thus immersed in the resin. Then, the projection 26a bends the aligned optical fibers 2 in the resin vessel 21 down to a position deeper than bottom surfaces of the guide grooves 22 and 23 and squeezes them, so that the resin permeates even between the individual optical fibers. When brought down, the presser plates 24 25 and 26 are clamped due to a magnetic force so as not to open despite sliding of the optical fibers during ribbonization.

Next, the upper ultraviolet ray-applying and fiber-holding members 31, which has been removed, is mounted together with the adapter 34, and an inert gas such as nitrogen or argon is supplied through the upper and lower gas introducing pipes 33 to fill the chambers in the upper and lower ultraviolet ray-applying and fiber-holding members 31 with the inert gas. In the resin hardening section 30, tips of the upper and lower quartz fiber light guides 32, on which ultraviolet rays are incident from the other ends thereof, vertically meet neighbors of the aligned optical fibers 2 within the diameter of the ultraviolet ray-applying and fiber-holding members 31.

In the above described state, when ultraviolet rays are continuously applied while the movement table 43 is slid in an arrow A direction in FIG. 1, the resin applied by the resin applying section 20 is hardened at the resin hardening section 30, and the plurality of optical fibers 1 introduced while being unraveled by the comb 11 are continuously ribbonized and delivered as the optical fibers 3.

In this manner, the ribbonizing apparatus according to this embodiment enables even short fibers to be ribbonized because no bobbins are used. Additionally, the comb 11 for aligning the individual optical fibers is used as a section for tensing the optical fibers, thereby preventing the optical fibers in the resin applying section 20 or the resin hardening section 30 from being Inappropriately arranged due to entanglement or intersection thereof.

In addition, in the resin applying section 20, the aligned optical fibers 2 can be easily set in the resin vessel 21 or the guide grooves 22 and 23 by standing up the presser plates 24, 25, and 26, resulting in easy operations compared to the manual insertion of the optical fibers into a conventional resin applying section integrally comprising a dice and a nipple. Further, the humped presser plate 26 is used to press the optical fibers in the resin vessel 21 of the resin applying section 20 and the optical fibers are bent and squeezed in the resin vessel 21, thereby enabling peripheries of the bundled optical fibers to be filled with the resin. Moreover, the resin applying section 20 need not have a closed structure but can be small and simple.

Moreover, since the upper ultraviolet ray-applying and fiber-holding members 31 is detachably mounted in the resin hardening section 30, it is easy to set the aligned optical fibers 2. Since an ultraviolet ray is introduced by means of the quartz fiber light guide 32 so as to harden the coated resin, it is possible to make the ribbonizing apparatus smaller and lighter compared with a case where an ultraviolet lamp is used to directly irradiate the coated resin to be hardened.

Additionally, in this embodiment, since parts and portions in contact with the optical fibers are composed of a material such as Teflon that has a smaller friction coefficient than the optical fiber coating material, these parts and portions need not undergo special surface treatment (for example, precision grinding, mirroring, or electro polishing), thereby reducing costs.

Further, this embodiment achieves continuous ribbonization by simply sliding the movement table 43 as described above, thereby providing a small ribbonizing apparatus that can be placed on a desk or that is portable.

In this embodiment, the fiber aligning section 10, the resin applying section 20, and the resin hardening section 30 are placed on the movement table 43, which is moved relative to the optical fibers, but these components may be placed on the fixed table 45 while the optical fibers may be relatively moved using the movement table 43.

Second Embodiment

Figure 4A:
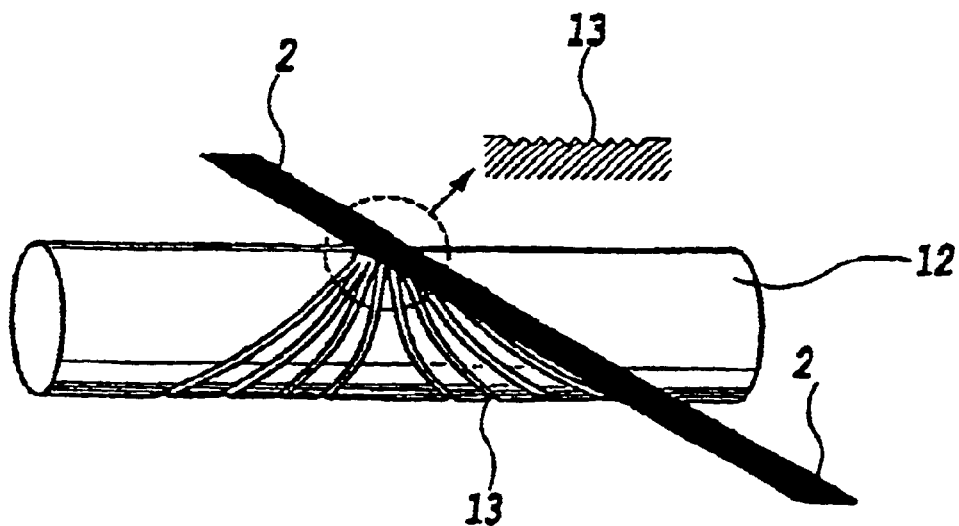
FIGS. 4A to 4C are views useful in explaining an automatic optical-fiber aligning method according to a second embodiment of the present invention.
Figure 4B:
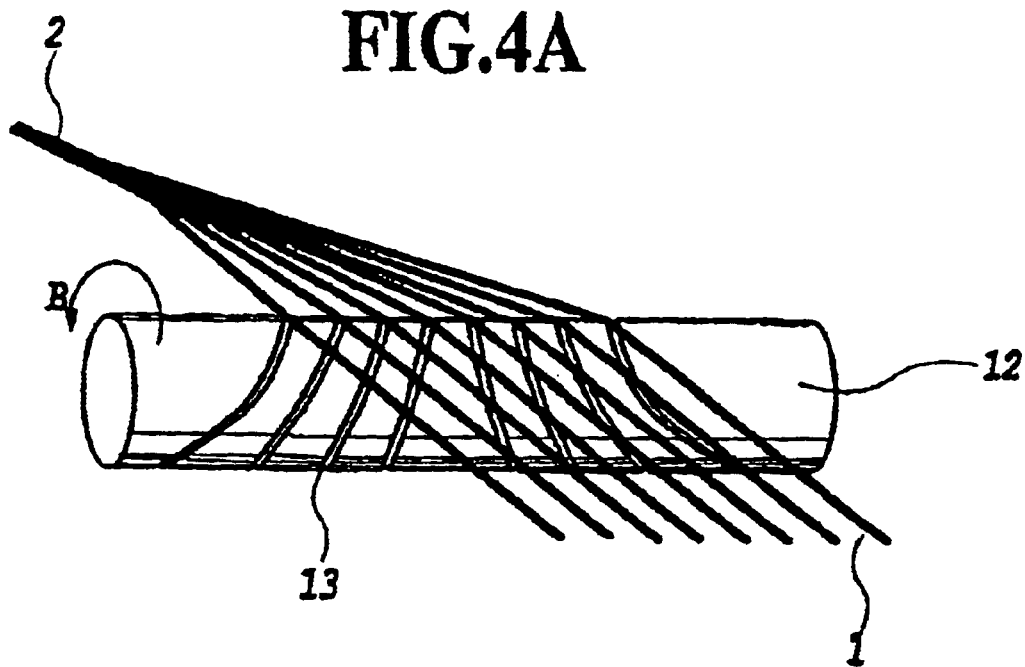
Figure 4C:
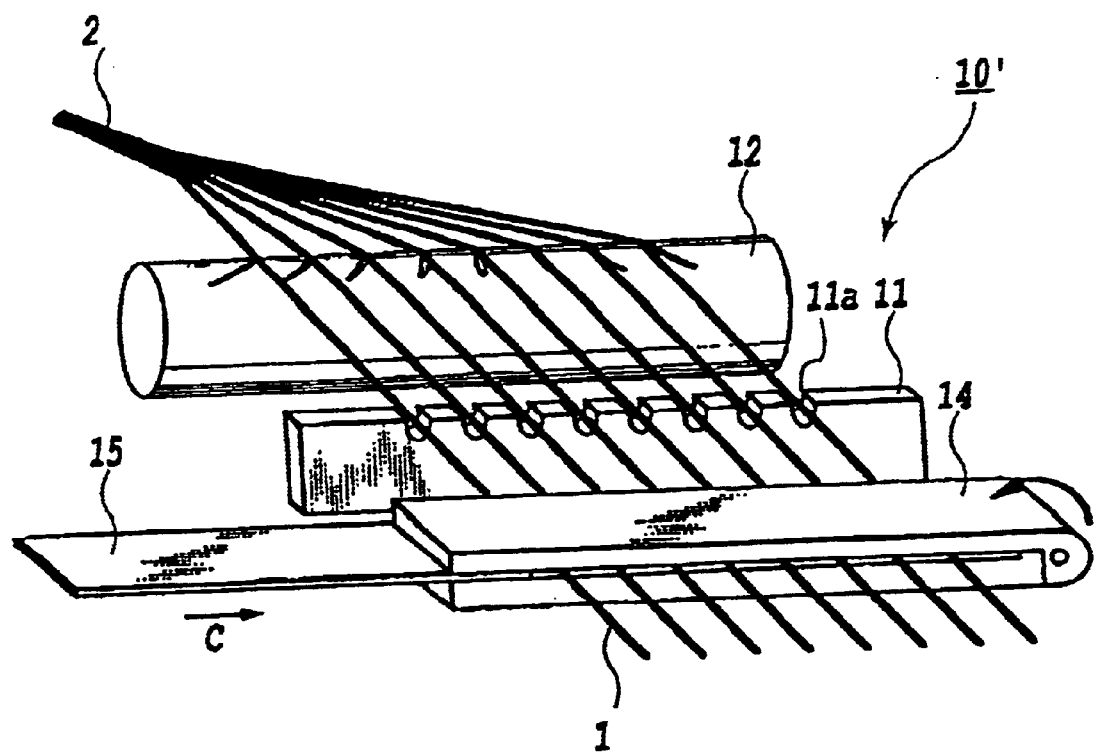

FIGS. 4A–4C are views useful in explaining an example of a fiber aligning section 10' that can automatically align even entangled optical fibers 1. The individual optical fibers 1 are assumed to be aligned as the aligned optical fibers 2 at one end (the left side of the optical fibers in FIGS. 4A–4C) thereof. A drum 12 has V-shaped guide grooves 13 formed along a circumferential direction of a peripheral surface thereof in such a manner that the pitch of the optical fibers increases gradually from one with which they are most closely aligned with one another.

FIG. 4A shows a state that an aligned portion of the optical fibers 1 is placed on the drum 12 at a portion of the guide grooves having the smallest pitch, and a Teflon plate (not shown) is pressed on the portion of the optical fibers 1 which is in contact with the drum 12 so that the optical fibers 1 are fitted in the guide grooves 13.

FIG. 4B shows a state that from the state shown in FIG. 4A, the drum 12 is rotated in an arrow B direction with the Teflon plate remaining pressed thereon. The drum 12 has been rotated to spread the fibers 1 in such a fashion as to follow the guide grooves 13.

FIG. 4C shows a state that the optical fibers 1 spread by the drum 12 are individually set in the corresponding slits 11*a* of the comb 11 near the drum 12 (in the figure, to the right thereof). When the interval of the spread optical fibers 1 is equal to the pitch of the slits 11*a*, the optical fibers 1 are automatically set in the slits 11*a* by simply abutting the comb 11 on them. Furthermore, a portion of the optical fibers 1 located near the comb 11 (in the figure, to the right thereof) is sandwiched in an alignment slit 14.

After the optical fibers 1 have been sandwiched In the alignment slit 14, the drum 12 and the comb 11 are lowered and removed from the optical fibers 1 and a spacer 15 inserted into the alignment slit 14 is pushed in an arrow C direction. A tip of the spacer 15 then pushes the optical fibers to one end of the alignment slit 14, so that the fibers are most closely arranged and converged. The aligned optical fibers 2 drawn out from the alignment slit 14 are guided to the guide grooves 22 and 23 in the resin applying section 20 shown in FIG. 1.

The alignment slit 14 is dimensioned and shaped such that the vertical interval of the slit is equal to or slightly larger than the outer diameter of the optical fibers 1. In addition, if a portion of the optical fibers 1 located near the drum 12 is sandwiched in the alignment slit 14 (the comb 11 is not used), the optical fibers 1 can be aligned by lowering only the drum 12. On the contrary, if the alignment slit 14 is not used, the fibers are aligned at certain intervals by means of the comb 11. The guide groove 13 is not limited to the V shape As described above, in this embodiment, since the optical fibers 1 are aligned by the drum 12, they can be individually aligned even if they are entangled with one another when drawn to the drum 12. Additionally, since the optical fibers are also aligned through the alignment slit 14, the arrangement and sequence of the optical fibers can be maintained even after tension has been released from the fibers. The drum 12 requires only a small installation space and can thus integrated into the ribbonizing apparatus easily.

Third Embodiment

Figure 5A:
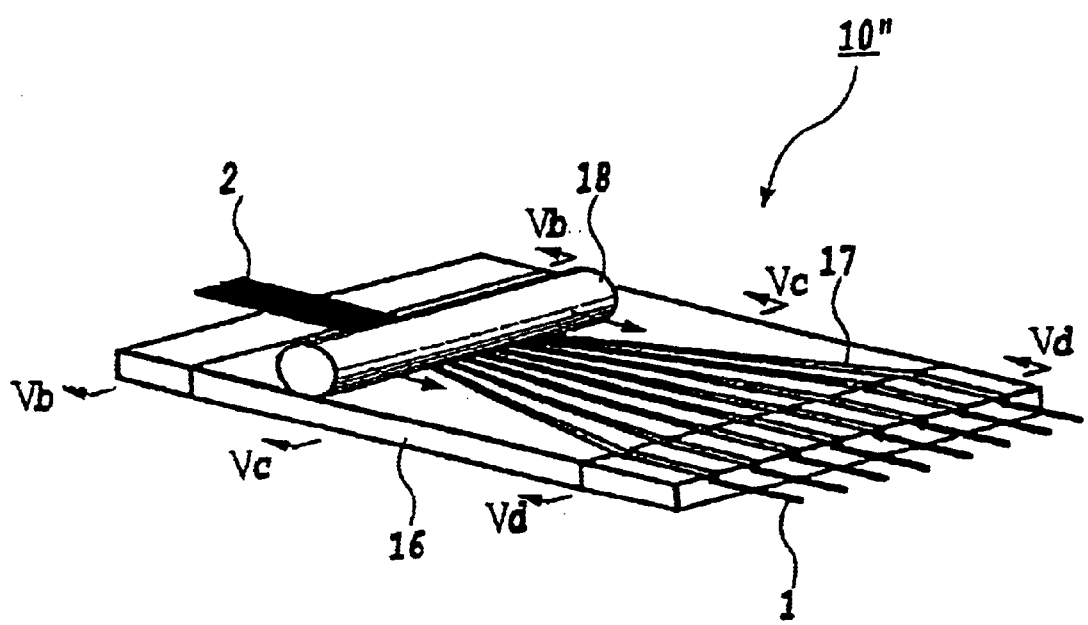
FIG. 5A is a view useful in explaining an automatic optical-fiber aligning method according to a third embodiment of the present invention and FIGS. 5B to 5D are sectional views of each section in FIG. 5A.
Figure 5B:
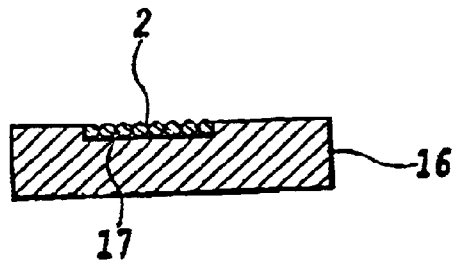
Figure 5C:
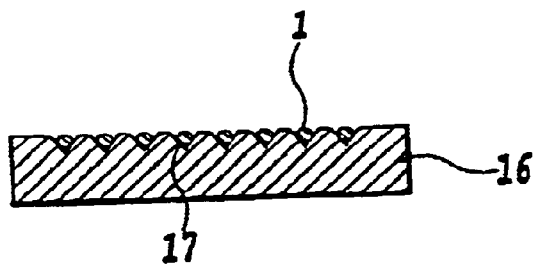
Figure 5D:
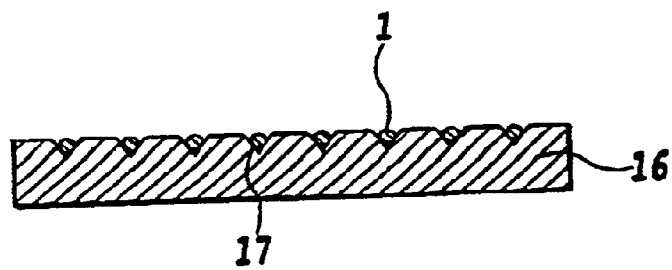

FIGS. 5A–5D are views useful in explaining another example of an alignment section 10" for automatically aligning the optical fibers. Again, the optical fibers 1 are assumed to be aligned with the aligned optical fibers 2 at one end thereof. A plate 16 has grooves 17 formed in such a manner that the pitch of the optical fibers increases gradually from a pitch wherein the optical fibers are most closely aligned with one another. When an aligned portion of the optical fibers 2 is placed on the plate 16 at the portion of the guide grooves 17 having the smallest pitch, and a Teflon bar 18 is pressed on the fibers and slid (rightward in the figure), the optical fibers 1 are spread in such a fashion as to follow the guide grooves 17. The optical fibers are subsequently set in the comb 11 and the alignment slit 14 in the same manner as in the example shown in FIGS. 4A–4C. FIG. 5B shows a cross section taken along line Vb—Vb of FIG. 5A, FIG. 5C shows a cross section taken along line Vc—Vc, and FIG. 5D shows a cross section taken along line Vd—Vd, respectively.

In this manner, in the alignment section 10" according to this embodiment, the guide grooves 17 are formed on the surface of the plate 16, thereby reducing manufacturing cost by eliminating the need for special machine tools.

Fourth Embodiment

Figure 6:
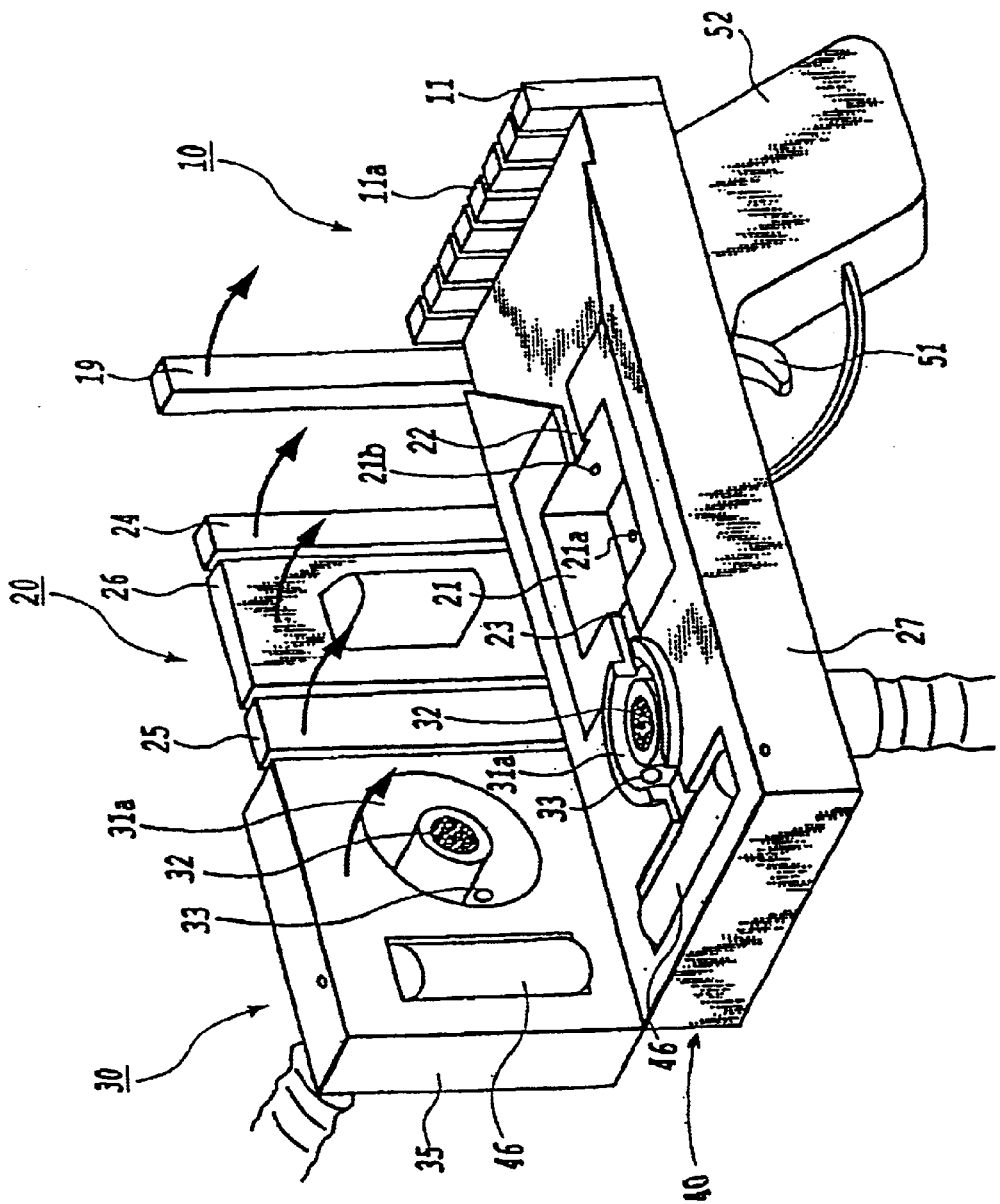
FIG. 6 is a perspective view of a ribbonizing apparatus according to a fourth embodiment of the present invention.

FIG. 6 is a perspective view showing the configuration of a portable ribbonizing apparatus according to another example of the present invention. A relative movement device (movement means) 40 for moving optical fibers comprises a pair of rotary rolls 46 that are rotated when an internal motor (not shown) is driven by pulling a pistol-type trigger 51. The resin applying section 20 and the resin hardening section 30 are arranged in a line between the rotary rolls 46 and the comb 11 of the fiber aligning section 10.

As in the configuration shown in FIG. 1, the resin applying section 20 comprises the main body 27 having the resin vessel 21 and the guide grooves 22 and 23 located before and after the resin vessel 21, respectively, as well as the presser plates 24, 25, and 26. Reference numeral 19 denotes a presser plate that presses a portion of optical fibers which 1*s* located between the comb 11 and the guide groove 22. The resin vessel 21 has the resin injecting or introducing hole 21*a* formed at the bottom thereof and the excess resin outflow hole 21*b* formed in the inner surface thereof so that the vessel 21 is always filled with a constant amount of resin from a resin tank (not shown) installed inside a handle 52.

At the resin hardening section 30, a lower side is integrated with the main body 27, whereas an upper side is formed as a standing and falling member 35 hinged to the main body 27 similarly to the presser plates 24, 25, and 26, so that optical fibers can be easily inserted therebetween. That is, a chamber 31*a* formed both in the standing and falling member 35 and in the main body 27 has the quartz fiber light guide 32 inserted thereinto and a gas introducing pipe opened thereinto. In addition, the above described rotary rolls 46 are provided opposite to the resin applying section 20 with respect to the chamber 31*a*. Parts or Portions of this embodiment having the same functions as those in the above described embodiment carry the same reference numerals, and duplicate description thereof is omitted.

As described above, since this embodiment provides a small ribbonizing apparatus shaped like a pistol, it is preferable for continuous ribbonization of a plurality of pig tails drawn out from an optical part or others.

Fifth Embodiment

Figure 7:
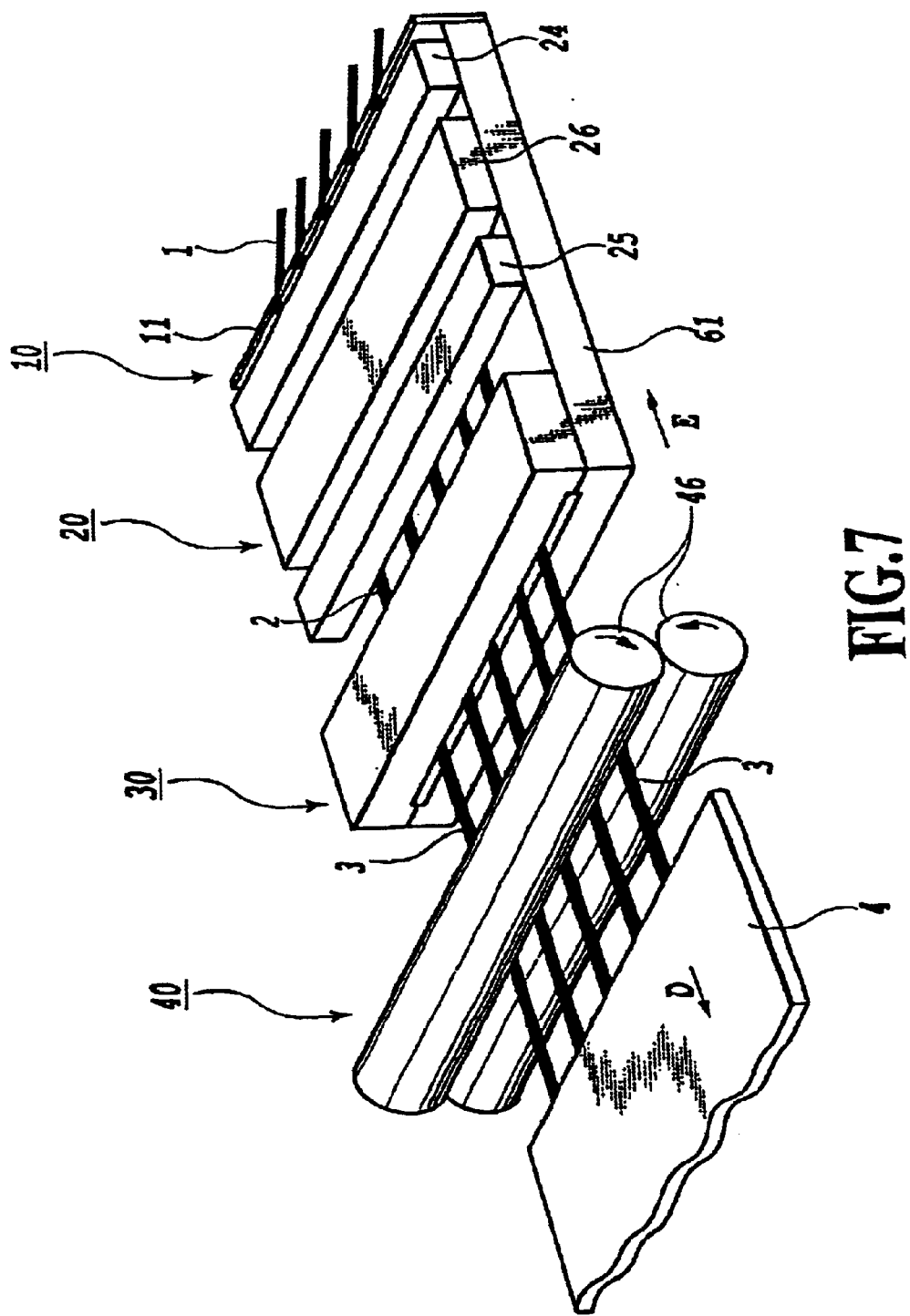
FIG. 7 is a perspective view of a collective ribbonizing apparatus according to a fifth embodiment of the present invention.

FIG. 7 is a view useful in explaining a collective ribbonizing apparatus according to the present invention. This collective ribbonizing apparatus collectively ribbonizes a plurality of bundles of optical fibers extending from an end of an I/O section 4 of an optical part. In this embodiment, the fiber aligning section 10, the resin applying section 20, and the resin hardening section 30 are mounted on a base 61 in a line, and plural bundles of optical fibers drawn out from the I/O section of the optical part are passed through these sections. The optical fibers are moved by pulling the I/O section 4 in an arrow D direction or rotating the pair of rotary rolls 46 to move the plural bundles of optical fibers relative to the base 61 together with the I/O section 4 of the optical part. Additionally, if the optical fibers are not moved, the rotary rolls 46 are removed and the base 61 is relatively moved in an arrow E direction.

The fiber aligning section 10, the resin applying section 20, and the resin hardening section 30 are connected or unified in parallel for ribbonization of a plurality of bundles. For example, the comb 11 and the presser plates 24, 25, and 26 are each elongated to eliminate the needs for duplication, thereby simplifying the configuration. For the resin vessel 21 of the resin applying section 20, only one piece is required, but for an ultraviolet ray applying chamber 31 of the resin hardening section 30, a common piece may be used or different pieces may be used for the respective bundles.

Sixth Embodiment

Figure 8:
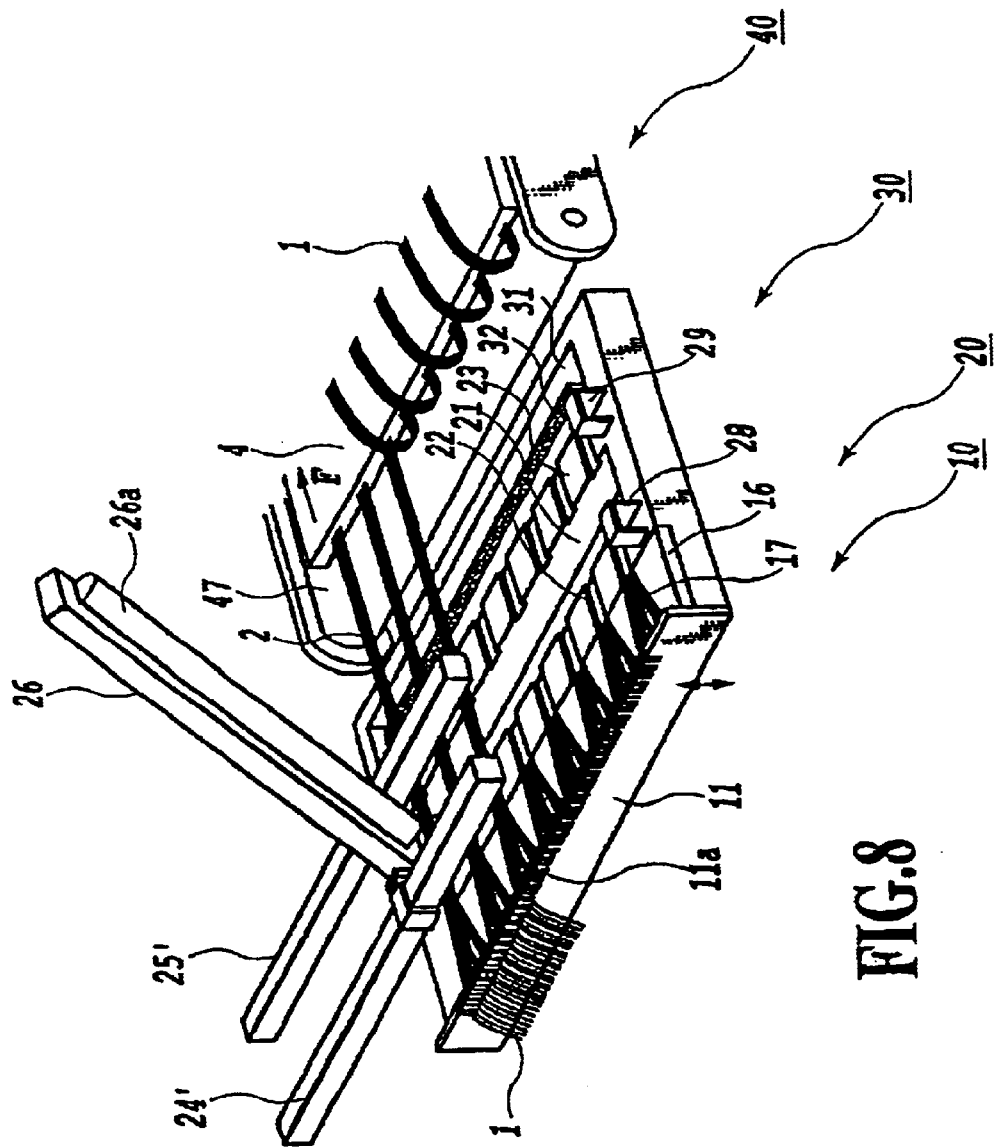
FIG. 8 is a perspective view of a collective ribbonizing apparatus according to a sixth embodiment of the present invention.

FIG. 8 is a view useful in explaining a collective ribbonizing apparatus according to another embodiment of the present invention. The fiber aligning section 10 comprises the comb 11 with the slits 11a and the plate 16 with the guide grooves 17. The resin applying section 20 comprises the resin vessel 21, the guide grooves 22 and 23 located before and after the resin vessel 21, respectively, the humped presser plate 26 with the projection 26a, and sliding presser plates 24' and 25'. The resin hardening section 30 comprises the quartz fiber light guide 32 in the ultraviolet ray applying chamber 31a. The relative movement device 40 comprises a belt conveyor 47 (the figure does not show the Teflon bar of the fiber aligning section 10 or the upper resin hardening section). These parts are integrated together in such a manner that the number of pieces of each part equals the number of bundles to be collectively ribbonized.

A ribbonizing operation is performed as follows: First, an optical part is mounted on the belt conveyor 47, and the bundles of optical fibers 1 extending from the end of the I/O section 4 of the optical part are installed in the guide grooves 22 and 23 starting with the those grooves that are the furthest from the reader in FIG. 8, while each bundle is squeezed by operator's fingers. Each time the bundle is installed, the presser plates 24' and 25' are fed inward (in the figure, toward the reader). Once all the bundles have been installed in the guide grooves 22 and 23, the presser plates 24' and 25' are fully fed until they are fitted in frames 28 and 29. The bundles of optical fibers can thus be installed starting with the one furthest from the reader in the figure to the one closest thereto resulting in easy operations. Additionally, since the comb 11 is structured to move downward, the top surface of the plate 16 and the comb 11 can be aligned with each other at the same level.

When pressed by the Teflon bar and then slid, the optical fibers 1 on the plate 16 are aligned within the guide groves 17. At this point, the comb 11 can be raised to individually set the optical fibers in the corresponding slits 11a. Then, the humped presser plate 26 is brought down to immerse portions of the aligned optical fibers 2 in the resin in the resin vessel 21, and the upper resin hardening section 30 is set. Further, an inert gas is supplied and ultraviolet rays are applied while the belt conveyor 47 is driven to move in an arrow F direction. As a result, the plural bundles of optical fibers are collectively ribbonized.

As described above, the present invention omits conventional bobbins and employs the movement means for integrally moving the fiber aligning means, the resin applying means, and the resin hardening means and/or the movement means for moving fibers, thereby enabling short optical fibers to be ribbonized to reduce the size of the apparatus while enabling a plurality of bundles to be collectively ribbonized. In addition, the optical fibers drawn out from the I/O section of the optical circuit board can be ribbonized up to neighborhoods of their roots.

Further, the present invention makes possible to reduce size and weight of the apparatus and realize ribbonization of even short pig tails by particularly employing the crystal fiber light guide as the resin hardening means, because it is not necessary to use a bulky and heavy ultraviolet ray source.

Further, the comb, the alignment slits, or the like can be used as the fiber aligning means to perfectly align entangled optical fibers with one another, thereby improving the reliability of the alignment. Furthermore, the drum with the guide grooves and the plate with the guide grooves serve to automate the alignment.

Moreover, if the resin applying means has an open structure or the resin hardening means is removable or can be stood up and brought down, the optical fibers can be more easily installed to facilitate operations.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. An optical fiber ribbonizing apparatus that arranges a plurality of optical fibers in parallel, applies a resin to peripheries of the plurality of optical fibers, and hardens the resin to form the optical fibers into a ribbon, the apparatus comprising:
   a ribbonizing jig including:
      fiber aligning means for aligning the plurality of optical fibers in parallel;
      resin applying means for applying the resin to the plurality of optical fibers aligned by the fiber aligning means, said resin applying means including:
         a main body having a resin vessel formed therein, first and second guide grooves being formed in said main body for guiding and aligning the plurality of optical fibers before and after traversing the resin vessel;
         first and second presser plates for pressing the optical fibers aligned in the first and second guide grooves; and
         a humped presser plate having a projection on a surface thereof for pressing the aligned optical fibers into said resin vessel;
      resin hardening means for hardening the resin applied to the optical fibers by the resin applying means, said fiber aligning means, said resin applying means and said resin hardening means being arranged in a line in an optical fiber inserting direction; and
      movement means for moving at least one of said ribbonizing jig and said plurality of optical fibers in a predetermined direction relative to the other.

2. An optical fiber ribbonizing apparatus according to claim 1, wherein said movement means comprises a linear motion stage including a movement table that linearly moves in a longitudinal direction of said optical fibers and a fixed table.

3. An optical fiber ribbonizing apparatus according to claim 1, wherein said movement means comprises a pair of rotary rollers for rotationally moving said optical fibers while vertically sandwiching them therebetween.

4. An optical fiber ribbonizing apparatus according to claim 1, wherein said movement means comprises a belt conveyor for moving said optical fibers while holding them.

5. An optical fiber ribonnizing apparatus according to claim 1, wherein said fiber alignment means comprises a comb-shaped member having slits for individually guiding the plurality of optical fibers.

6. An optical fiber ribbonizing apparatus according to claim 1, wherein said fiber aligning means comprises an alignment slit member having a gap corresponding to one optical fiber and through which a plurality of optical fibers can be inserted in parallel, and a spacer sliding through the slit.

7. An optical fiber ribbonizing apparatus according to claim 1, wherein said fiber alignment means comprises a drum having guide grooves formed along a circumferential direction of a peripheral surface thereof in such a manner that a pitch of the optical fibers increases gradually from a pitch wherein the optical fibers are closely aligned with one another.

8. An optical fiber ribbonizing apparatus according to claim 1, wherein said fiber alignment means comprises a plate having guide grooves formed in a plane thereof in such a manner that a pitch of the optical fibers increases gradually along the plane from a pitch wherein the optical fibers are closely aligned with one another.

9. An optical fiber ribbonizing apparatus according to claim 1, wherein said first and second presser plates are movable from a first open position to a second position for pressing the optical fibers in said main body, said first and second presser plates being maintained in said second position by a magnetic force.

10. An optical fiber ribbonizing apparatus according to claim 1, wherein said first and second presser plates press said optical fibers by sliding over said first and second guide grooves in a direction that crosses the optical fibers.

11. An optical fiber ribbonizing apparatus according to claim 1, wherein said humped presser plate is movable from a first open position to a second position for pressing the optical fibers into said resin vessel, the projection on said humped presser plate extending beyond bottom surfaces of said first and second guide grooves when the optical fibers are pressed.

12. An optical fiber ribbonizing apparatus according to claim 1, wherein said resin hardening means comprises ultraviolet ray-applying and fiber-holding members located above and below said optical fibers, light guides for applying ultraviolet rays for hardening, the light guides being held in said ultraviolet ray-applying and fiber-holding members, and gas introducing pipes for introducing an inert gas into a chamber between each of said ultraviolet ray-applying and fiber-holding members and the corresponding light guide.

13. An optical fiber ribbonizing apparatus according to claim 12, wherein said ultraviolet ray-applying and fiber-holding members are cylindrical members, and the lower cylindrical member is mounted in a hole formed in a movement table while the upper cylindrical member is mounted on said movement table via an adapter.

14. An optical fiber ribbonizing apparatus according to claim 1, wherein at least portions of said fiber aligning menas, said resin applying means, and resin hardening means which are in contact with the optical fibers comprise a material having a smaller friction coefficient than a coating material for the optical fibers.

15. An optical fiber ribbonizing apparatus that arranges a plurality of optical fibers in parallel, applies a resin to peripheries of the plurality of optical fibers, and hardens the resin to form the optical fibers into a tape or a ribbon, the apparatus comprising:

fiber aligning means for aligning the plurality of optical fibers in parallel;

resin applying means for applying the resin to the plurality of optical fibers aligned by the fiber aligning means;

resin hardening means for hardening the resin applied to the optical fibers by the resin applying means, said fiber aligning means, said resin applying means and said resin hardening means being arranged in a line in an optical fiber inserting direction; and movement means for moving said plurality of optical fibers in a predetermined direction relative to said fiber aligning means, said resin applying means and said resin hardening means, said movement means comprising a pair of rotary rollers driven by a motor activated by a trigger for rotationally moving said optical fibers while sandwiching them therebetween; and said fiber aligning means, said resin applying means, said resin hardening means, and said movement means being formed within an integral main body, said main body having a built-in resin tank and a handle providing hand held support for the main body.

16. An optical fiber ribbonizing apparatus according to claim 15, wherein said resin hardening means comprises ultraviolet ray-applying and fiber-holding means located above and below said optical fibers, light guides for applying ultraviolet rays for hardening, the light guides being held in said ultraviolet ray-applying and fiber-holding means, and a gas introducing pipe for introducing an inert gas into a chamber between each of said ultraviolet ray-applying and fiber-holding means and the corresponding light guide, and said upper ultraviolet ray-applying and fiber-holding means is a member hinged to said main body, while said lower ultraviolet ray-applying and fiber-holding means is said main body.

17. An optical fiber ribbonizing apparatus that arranges a plurality of optical fibers in parallel, applies a resin to peripheries of the plurality of optical fibers, and hardens the resin to form the optical fibers into a plurality of tapes or ribbons, the apparatus comprising:

fiber aligning means for aligning the plurality of optical fibers in parallel;

resin applying means for applying the resin to the plurality of optical fibers aligned by the fiber aligning means which is comprised of a main body including:

a resin vessel formed therein, first and second guide grooves being formed in said main body for guiding and aligning the plurality of optical fibers before and after traversing the resin vessel;

first and second presser plates for pressing the optical fibers aligned in the first and second guide grooves; and a humped presser plate for pressing the aligned optical fibers into said resin vessel;

resin hardening means for hardening the resin applied to the optical fibers by the resin applying means, said fiber aligning means, said resin applying means and said resin hardening means being arranged in a line in an optical fiber inserting direction; and movement means for moving said plurality of optical fibers in a predetermined direction relative to said fiber aligning means, said resin applying means and said resin hardening means, said movement means being a belt conveyor for carrying an optical part and for moving said optical fibers extending from said optical part, wherein said fiber aligning means, said resin applying means and said resin hardening means are each formed to allow plural bundles of optical fibers to be individually inserted therethrough to individually and collectively ribbonize the plural bundles of optical fibers.

18. An optical fiber ribbonizing apparatus according to claim 17, wherein said first and second presser plates are movable from a first open position to a second position for pressing the optical fibers in said main body, said first and second presser plates being maintained in said second position by a magnetic force.

19. An optical fiber ribbonizing apparatus according to claim 17, wherein said first and second presser plates press said optical fibers by sliding over said first and second guide grooves in a direction that crosses the optical fibers.

20. An optical fiber ribbonizing apparatus according to claim 17, wherein said humped presser plate has a projection thereon and is movable from a first open position to a second position for pressing the optical fibers into said resin vessel, said projection extending beyond bottom surfaces of said first and second guide grooves when the optical fibers are pressed.

* * * * *